United States Patent
Isaacs et al.

(10) Patent No.: US 7,454,470 B1
(45) Date of Patent: Nov. 18, 2008

(54) SYSTEM AND METHOD FOR ANALYZING COMMUNICATIONS

(75) Inventors: Ellen Isaacs, Belmont, CA (US); Bonnie A. Nardi, Mountain View, CA (US); Stephen Whittaker, Morristown, NJ (US)

(73) Assignee: AT&T Intellectuall Property II, L.P., Reno, NV (US)

( * ) Notice: Subject to any disclaimer, the term of this patent is extended or adjusted under 35 U.S.C. 154(b) by 644 days.

(21) Appl. No.: 10/979,960

(22) Filed: Nov. 3, 2004

Related U.S. Application Data

(63) Continuation of application No. 09/726,912, filed on Nov. 30, 2000, now Pat. No. 6,832,245.

(60) Provisional application No. 60/168,242, filed on Dec. 1, 1999.

(51) Int. Cl.
G06F 15/16 (2006.01)

(52) U.S. Cl. .................................. 709/206

(58) Field of Classification Search ............. 709/206, 709/207, 217; 707/7
See application file for complete search history.

(56) References Cited

U.S. PATENT DOCUMENTS

| | | | |
|---|---|---|---|
| 4,860,339 A * | 8/1989 | D'Agosto et al. ........ 379/88.11 |
| 5,377,354 A | 12/1994 | Scannell et al. |
| 5,694,616 A | 12/1997 | Johnson et al. |
| 5,812,770 A * | 9/1998 | Sakai ........................ 709/245 |
| 5,948,058 A | 9/1999 | Kudoh et al. |
| 5,966,714 A * | 10/1999 | Huang et al. ............... 707/201 |
| 6,119,114 A | 9/2000 | Smadja |
| 6,144,934 A | 11/2000 | Stockwell et al. |
| 6,202,058 B1 | 3/2001 | Rose et al. |
| 6,330,079 B1 * | 12/2001 | Dugan et al. ............... 358/403 |
| 6,351,764 B1 | 2/2002 | Voticky et al. |
| 6,396,513 B1 | 5/2002 | Helfman et al. |
| 6,480,885 B1 | 11/2002 | Olivier |
| 6,487,600 B1 * | 11/2002 | Lynch ......................... 709/229 |
| 6,499,021 B1 * | 12/2002 | Abu-Hakima ............... 706/10 |
| 6,546,417 B1 | 4/2003 | Baker |
| 6,584,471 B1 | 6/2003 | Maclin et al. |
| 6,587,549 B1 | 7/2003 | Weik |
| 6,606,647 B2 | 8/2003 | Shah et al. |
| 6,615,241 B1 | 9/2003 | Miller et al. |

(Continued)

OTHER PUBLICATIONS

Kenrick Mock, Dynamic Email Organization via Relevance Categories, Intel Corp., Tools with Artificial Intelligence, 1999. Proceedings. 11th IEEE International Conference, pp. 399-405.*

*Primary Examiner*—Andrew Caldwell
*Assistant Examiner*—Barak Nissan

(57) ABSTRACT

The invention provides a system and method for analyzing a collection of communication messages. The communication messages may be any one of a collection of electronic mail messages, voicemail messages, instant messaging dialogues and other forms of communications. The collections of communications, such as electronic mail messages, may be selected by a user and then subsequently processed to determine the identity of any of the user's contacts within the communications. The contacts may then be arranged in a relative priority arrangement whereby contacts which have been identified as engaging in prior reciprocal communications with the user are given higher priority. Higher priority may also be given to contacts which engage in more recent communications with the user. Specific contact relationships may be inferred from the communications depending on whether specific contacts are repeatedly mentioned within the communication messages.

26 Claims, 16 Drawing Sheets

U.S. PATENT DOCUMENTS

| | | |
|---|---|---|
| 6,622,160 B1 | 9/2003 | Horvitz |
| 6,625,258 B1 * | 9/2003 | Ram et al. ............... 379/88.13 |
| 6,654,787 B1 | 11/2003 | Aronson et al. |
| 6,654,791 B1 | 11/2003 | Bates et al. |
| 6,745,230 B1 * | 6/2004 | Cao et al. ................... 709/206 |
| 6,779,022 B1 * | 8/2004 | Horstmann et al. ......... 709/206 |
| 6,821,851 B2 * | 11/2004 | Hergenrother et al. ...... 438/268 |
| 6,940,955 B1 * | 9/2005 | Jones et al. ............... 379/88.23 |
| 6,980,870 B1 * | 12/2005 | Mok et al. ................... 700/90 |

* cited by examiner

FIG. 6  600

| Include? | Name | Address | Oldest | Newest | Score |
|---|---|---|---|---|---|
| ☐ | Jacob Bardam | bardram@dk.ibm.com | 02-Dec-... | 02-Dec-... | 101 |
| ☐ | T.L. Taylor | ttaylor@binah.cc.brandeis.edu | 02-Dec-... | 02-Dec-... | 101 |
| ☐ | Cornwell, Patricia | cornwell@exch.hpl.hp.com | 02-Dec-... | 02-Dec-... | 202 |
| ☐ | Seacliff Secritarial | ccliff@flash.net | 03-Dec-... | 03-Dec-... | 101 |
| ☐ | Raven Earlygrow | anima@mcn.org | 04-Dec-... | 04-Dec-... | 101 |
| ☐ | Weller, Susan C. | sweller@utmb.edu | 08-Dec-... | 08-Dec-... | 101 |
| ☐ | Dr. Yair Neuman | yneuman@bgumail.bgu.ac.il | 19-Jan-99 | 19-Jan-99 | 101 |
| ☐ | | Michael_Muller/CAM/@lotus.com | 19-Jan-99 | 19-Jan-99 | 101 |
| ☐ | Mark Goldstein | kvetch@worldnet.att.net | 21-Jan-99 | 21-Jan-99 | 101 |
| ☐ | Jean Scholtz | jean.scholtz@nist.gov | 27-Feb-... | 27-Feb-... | 101 |
| ☐ | | scholtz@zing.ncsl.nist.gov | 27-Feb-... | 27-Feb-... | 2 |
| ☐ | Gitte Wind Johans. | gitte_johansen@image.dk | 28-Feb-... | 28-Feb-... | 101 |
| ☐ | Dr.Dr.Norbert Streitz | streitz@darmstadt.gmd.de | 25-Mar-99 | 25-Mar-99 | 101 |
| ☐ | | Andrew_L_Cohen/CAM/@lotus.com | 02-Mar-99 | 02-Mar-99 | 101 |
| ☐ | | jjohnson@uiwizards.com(jeff johnson) | 04-Mar-99 | 04-Mar-99 | 101 |
| ☐ | Yin Yin Wong | yinyin@dnai.com | 05-Mar-99 | 05-Mar-99 | 101 |
| ☐ | | Sbarley@leland.stanford.edu | 05-May-... | 05-May-... | 3 |
| ☐ | Katie Hafner | hafner@nytimes.com | 06-May-... | 06-May-... | 101 |
| ☐ | Katherine Innis | kinnis@mit.edu | 06-May-... | 06-May-... | 101 |
| ☐ | Aileen Broccardo | aileen@ics.uci.edu | 14-Jun-99 | 14-Jun-99 | 101 |
| ☐ | Susi Skomal | SSKOMAL@aaanet.org | 14-Jun-99 | 14-Jun-99 | 101 |
| ☐ | Frank Cervarich | ccc@cais.com | 14-Jun-99 | 14-Jun-99 | 101 |
| ☐ | | dsjohnson@att.com | 14-Jun-99 | 14-Jun-99 | 101 |
| ☐ | E-care | E-care@greenmountian.com | 15-Jun-99 | 15-Jun-99 | 101 |
| ☐ | Syed Shariq | sshariq@stanford.edu | 21-Jul-99 | 21-Jul-99 | 1 |

```
/* -*Java-*-
***********************************************************************
*
* File:         MATContactCounts.java
* RCS:          $Header: $
* Description:
* Author:       John Hainsworth
* Created:      Fri Sep 03 15:17:42 1999
* Modified:     Thu Sep 09 16:15:41 1999 (Michael L. Creech) mike@home
* Language:     Java
* Package:      com.att.research.mat.email
* Status:       Experimental (Do Not Distribute)
*
* (c) Copyright 1999, AT&T, all rights reserved.
*
***********************************************************************
*
* Revisions:
*
* Thu Sep 09 16:15:31 1999 (Michael L. Creech) mike@home
*  Added getOldest( ), and getNewest( ).
* Fri Sep 03 15:17:46 1999 (Michael L. Creech) mike@home
*  Made getOrderingValue( ) public.
***********************************************************************
*/
package com.att.research.mat.email;

import java.io.PrintWriter;
import java.io.IOException;
import java.util.Date;

/** Statistics about mail to and from one e-mail address.
 * These statistics are all redundant with respect to the data,
 * so none of them are saved with the data.
 */
```

```
⋮                                                                                    ⋮ public class MATContactCounts {
  /** Copyright (c) 1999 AT&T labs */
  static public String Copyright = "Copyright (c) 1999 AT&T Labs";

static final private int CountNONE = -1;
  static final private double DCountNONE = -1.0;

static final int FromME = 0;
  static final int FromOTHER = FromME + 1;
  static private final int From_N = FromOTHER + 1;
  static private final String StrFrom[ ] = { "My", " " };

/** seen in an original message */
  static final int KindCOMPOSITION = 0;
  /** seen in a reply message */
  static final int KindREPLY = KindCOMPOSITION + From_N;
  /** seen in a forwarded message */
  static final int KindFORWARD = KindREPLY + FROM_N;
  static private final int Kind_N = KindFORWARD + From_N;
  static private final String StrKind[ ] = { " ", "Repl", "Fwd" };

/** seen in a "To:" header */
  static final int WhereTo = 0;
  /** seen in a "From:" header */
  static final int WhereFROM = WhereTO + Kind_N;
  /** seen in a "Cc:" header */
  static final int WhereCC = WhereFROM + Kind_N;
  /** seen in a "Bcc" header */
  static final int WhereBcc = WhereCC + Kind_N;
  static private final int Where_N = WhereBCC + Kind_N;
  static private final String StrWhere[ ] = { "To", "From", "Cc", "Bcc" };
```

FIG. 7B

```java
// Java will initialize these to 0
private int counts[ ] = new int [Where_N];

Date newest;
Date oldest;

public Date getOldest ( )
  {
    return oldest;
  } public Date getNewest( )
  {
    return newest;
  }

/** @param what Should always be of the form (From?? + Kind?? + Where??) */
void incrementCount(Date d, int what) {
  counts[what]++;
  if (null != d) {
    if (nill == newest) {
      oldest = newest = d;
    } else {
      long nms = d.getTime( );
      if (nms > newest.getTime( ) ) {
        newest = d;
      } else if (nms < oldest.getTime( ) ) {
        oldest = d;
      }
    }
  }
}

/** @param what Should always be of the form (From?? + Kind?? + Where??) */
int getCount(int what) {
  return counts[what];
}
```

FIG. 7B continued

```
/** Set all counters to zero. */
void clear( ) {
   int i = 0;
   while (i < Where_N) {
      counts[i++] = 0;
   }
   nonZeroTotal = CountNONE;
   orderingValue = CountNONE;
   oldest = newest = null;
   duration = CountNONE;
   density = CountNONE;
   freshness = DCountNONE;
}

/** Get total number of messages this contact actually appeared in.
 * Since we add To:s to Cc:s and Cc:s to Bcc:s, we just need to count
 * From:s and Bcc:s. */
private int getMessageCount( ) {
   return (counts [FromME    + KindCOMPOSITION + WhereFROM] +
           counts [FromME    + KindREPLY       + WhereFROM] +
           counts [FromME    + KindFORWARD     + WhereFROM] +
           counts [FromOTHER + KindCOMPOSITION + WhereFROM] +
           counts [FromOTHER + KindREPLY       + WhereFROM] +
           counts [FromOTHER + KindFORWARD     + WhereFROM] +
           counts [FromME    + KindCOMPOSITION + WhereBCC]  +
           counts [FromME    + KIndREPLY       + WhereBCC]  +
           counts [FromME    + KindFORWARD     + WhereBCC]  +
           counts [FromOTHER + KindCOMPOSITION + WhereBCC]  +
           counts [FromOTHER + KindREPLY       + WhereBCC]  +
           counts [FromOTHER + KindFORWARD     + WhereBCC]);
}
```

FIG. 7C

```
private long duration = CountNONE;
public long getDuration( ) {
  if (CountNONE == duration) {
    if (null != oldest) {
      duration = newest.getTime( ) - oldest.getTime( );
    } else {
      duration = 0;
    }
  }
  return duration;
} private long density = CountNONE;
public long getDensity( ) {
  if (CountNONE == density) {
    long dur = getDuration( );
    if (0 < dur) {
      density = getMessageCount( ) / dur;
    } else {
      density = 0;
    }
  }
  return density;
} private double freshness = DCountNONE;
public double getFreshness( ) {
  if (DCountNONE == freshness ) {
    freshness = ( ( (double) getDensity( ) ) /
               ( (double) ( (new Date( ) ) .getTime( ) - newest.getTime( ) ) ) );
  }
  return freshness;
}
```

FIG. 7C continued

```
⋮                                                                    ⋮
private int noneZeroTotal = CountNONE;
int getNonZeroTotal ( ) {
  if (CountNONE == nonZeroTotal) {
    nonZeroTotal = 0;
    int i = 0;
    while (i < Where_N) {
      nonZeroTotal += counts [i];
      i += 1;
    }
  }
  return nonZeroTotal;
} private int orderingValue = CountNONE;

// MLC:
public int getOrderingValue ( ) {
  if (CountNONE == orderingValue) {
    ordeingValue =
      counts [FromME + KindREPLY + WhereTO] * 1000000 +
      counts [FromME + KindCOMPOSITION + WhereTO] * 10000 +
      counts [FromOTHER + KindREPLY + WhereFROM] * 100 +
      counts [FromOTHER + KindCOMPOSITION + WhereFROM] * 100 +
      getNonZeroTotal ( );
  }
  return orderingValue;
}
```

FIG. 7D

```
private String print1 (String leader, PrintWriter ps, int what)
  throws IOException {
  if (0 != counts [what]) {
    int iFrom = what % From_N;
    int iKind = (what % Kind_N) / From_N;
    int iWhere = what / Kind_N;
    ps.print (leader+StrFrom[iFrom]+StrKind[iKind]+StrWhere[iWhere]+
           "="+counts[what] );
    leader = " ";
  }
  return leader;
} public void print (PrintWriter ps, int format) throws IOException {
  switch (format) {
  case MATData.FormatANALYSIS:
    String leader = " {";
    int what = 0;
    leader = print1 (leader, ps, FromME + KindREPLY + WhereTO);
    leader = print1 (leader, ps, FromME + KindCOMPOSITION + WhereTO);
    leader = print1 (leader, ps, FromOTHER + KindREPLY + WhereFROM);
    leader = print1 (leader, ps, FromOTHER + KindCOMPOSITION + WhereFROM);
    while (what < Where_N) {
      switch (what) {
      case FromME + KindREPLY + WhereTO:
      case FromME + KindCOMPOSITION + WhereTO:
      case FromOTHER + KindREPLY + WhereFROM:
      case FromOTHER + KindCOMPOSITION + WhereFROM:
        break;
      default:
        leader = print1 (leader, ps, what);
        break;
      }
      what++;
    }
    if (leader.equals(" ") ) {
      ps.print ("}");
    }
    break;
```
⋮

FIG. 7D continued

```
  ⋮
    case MATData.FormatTERMINAL:
       int what2 = 0;
       String leader2 = " ";
       while (what2 < Where_N) {
          leader = print1 (leader2, ps, what2++);
       }
       if (leader2.equals (" ") ) {
         ps.print ("}");
       }
       ps.print (" score="+getOrderingValue ( ) );
       break;
    case MATData.FormatDATABASE:
       break;
    }
  }
}
```

FIG. 8A

```
package com.att.research.mat.email;

import com.att.research.mat.utility.UniqueIDs;
import com.att.research.mat.utility.NumberedMember;
import java.util.Enumeration;
import java.io.PrintWriter;
import java.io.IOException
import java.io.StringWriter;
import java.util.Date;

/** A list of contacts that appeared together on a To, Cc, or Bcc line. */ public class MATContactGroup extends UniqueIDs {
   /** Copyright (c) 1999 AT&T Labs */
   static public String Copyright = "Copyright (c) 1999 AT&T Labs";

/** @serial cc not stored */
   private MATContacts cc;

// MLC:
   public MATContacts getMATContacts ( )
      {
        return cc;
      } public MATContactGroup (MATContacts cc) {
      this.cc = cc;
   } public Enumeration elements ( ) { return elements (cc); } public void hideUnimportantMembers (int threshold) {
      Enumeration e = elements (cc);
      while (e.hasMoreElemets ( ) ) {
         ((MATContact) e.nextElement ( ) ) .hideIfUnimportant (threshold);
      }
   }
```

```
public boolean containsMe ( ) {
   Enumeration e = elements (cc);
   while (e.hasMoreElements ( ) ) {
      if ( ( (MATContact) e.nextElement ( ) ) .isMe ( ) ) {
         return true;
      }
   }
   return false;
}

/** @return Unique id of removed member. */
public int removeMe ( ) {
   int i = 0;
   Enumeration e = elements (cc);
   while (e.hasMoreElements ( ) ) {
      MATContact c = (MATContact) e.nextElement ( );
      if (c.isMe ( ) ) {
         removeElementAt (i);
         return c.getUniqueId ( );
      }
      i++;
   }
   return NumberedMember.IdNONE;
}
```

FIG. 8B

```
public MATContactGroup updateToRemoveMe ( ) {
    int removedMe = removeMe ( );
    if (NumberedMember.IdNONE != removedMe) {
      int others = toMATContactID ( );
      MATContactGroup meGroup = new MATContactGroup(cc);
      meGroup.addElement (removedMe);
      meGroup.addElement (others);
      meGroup.sortIDs ( );
      return meGroup;
    } else {
      return null;
    }
} public int toMATContactID ( ) {
   switch (size( ) ) {
   case 0:
      return NumberedMember.IdNONE;
   case 1:
      return uniqueIdAT (0);
   default:
      int removedMe = removeMe ( );
      if (NumberedMember.IdNONE != removedMe) {
        int others = toMATContactID ( );
        MATContactGroup meGroup = new MATContactGroup(cc);
        meGroup.addElement(removedMe);
        meGroup.addElement(others);
        meGroup.sortIDs ( );
        MATContact c = cc.find (meGroup);
        c.setHidden(true);
        return c.getUniqueID ( );
      } else {
        sortIds ( );
        return cc.find(this).getUniqueId ( );
      }
   }
}
```

*FIG. 8B continued*

```
/** Calls {@link com.att.research.mat.email.MATContact#incrementCount(Date, int)}
 * for each member. */
void incrementCount(Date d, int what) {
    Enumeration e = elements(cc);
    while (e.hasMoreF

*/
// This method MUST use cc, and cannot get it as an argument.
// This is the only true reason that cc must be a member of this object.
public String toString( ) {
    StringWriter sw = new StringWriter( );
    PrintWriter ps = new PrintWriter(sw);
    try {
       print(ps, cc, " ", MATData.FormatADDRESS_ONLY);
    } catch (IOException e) {
    }
    return sw.toString( );
  }
}
```

SYSTEM AND METHOD FOR ANALYZING COMMUNICATIONS

CROSS-REFERENCE TO RELATED APPLICATION

This non-provisional application claims priority from U.S. Provisional Application No. 60/168,242 filed Dec. 1, 1999 and titled "ContactMap: Designing Our Digital Lives." Further, this is a continuation of U.S. patent application Ser. No. 09/726,912, filed Nov. 30, 2000, now U.S. Pat. No. 6,832,245, issued Dec. 14, 2004. The entire disclosures of these documents are incorporated by reference herein in their entirety as if fully reproduced herein.

BACKGROUND OF THE INVENTION

The present invention relates generally to communications, and more particularly, to a system and a method for analyzing a user's collection of communications, such as electronic mail messages, telephone messages, voicemails, instant messaging dialogues and telephone logs to determine the identity of contacts within the communications, the relative priority of the contacts within the communications and any relationships between the contacts themselves and between the contacts and the user.

The ever-growing variety of mass communication devices and services such as wireless telephones, pagers, portable computers, personal digital assistants (PDAs), set top boxes, electronic mail, and instant messaging among others, has exponentially increased the number of different types of communications that one may receive on a daily basis. As a result, it has become very difficult to track one's personal and professional contacts since after even a short period of time, one could have hundreds of unique communications, such as electronic mail messages and voicemails to sort through.

Accordingly, it would be desirable to be able to easily analyze a collection of communications, such as electronic mail messages, to determine the identity of one's personal and professional contact, the relative priorities of these contacts and any existing relationship between and among these contacts.

SUMMARY OF THE INVENTION

The invention provides a method for processing user communications to determine identities of contacts within the communications, to prioritize the relative importance of the contacts identified and to establish any relationships between the contacts themselves and between the contacts and the user. In one embodiment, the method includes the steps of receiving a plurality of communication files, wherein the communication files include a plurality of different contacts, reviewing the plurality of communication files to determine contact identities, contact priorities and relationships and providing an analysis of the communication files, wherein the analysis provides the identities of contacts identified in the communication files, the relative importance of contacts relative to one another and any relationships between two or more contacts.

In the present invention, a contact may be refer to an individual person, a company, a group of individual people, an organization, an electronic mail listing or any combination or variations of the aforementioned. Contacts may be related to a user's personal life, workplace or other social networks. Typically, the user will specify a directory, folder or other repository which contains the communications, such as the electronic mail messages to be analyzed. A communications or message processor will receive the communications and from these communications, determine at least the identity of the contacts and their relative priority to one another to the user. For example, contacts which engage in frequent, reciprocal communications with the user are rated or assigned a higher priority than contacts which only engage in one-way communications with the user. Though the sheer number of communications a contact may have with the user is relevant in determining the contact priority, the reciprocal nature of the communications is more indicative as to the importance of the communications.

In one embodiment of the present invention, contacts which are frequently mentioned or "co-mentioned" within communication may also be classified as being related to a similar grouping or network in relation to the user. For example, co-workers who frequently copy each other on electronic mail message may be considered to be part of a single grouping of contacts.

BRIEF DESCRIPTION OF THE DRAWINGS

FIG. 6 illustrates an exemplary message processing display in accordance with the teachings of the present invention.

FIGS. 7a-7d illustrate an exemplary code implementation of a sorting method in accordance with the teachings of the present invention.

FIGS. 8a-8b illustrate an exemplary code implementation of a clustering method in accordance with the teachings of the present invention.

DETAILED DESCRIPTION OF THE INVENTION

The present invention provides a system and method for analyzing a user's communications, such as electronic mail messages, voicemail messages, instant messages, telephone logs and other such communications. The communications are analyzed to determine the identity of any contacts within the communications, the priority of the contacts within the communications and any inferred relationships between the contacts themselves and between the contact(s) and the user. As used herein, the term contact is used to refer to an individual person, a company, a group of individual people, an organization, an electronic mail listing or a combination of the aforementioned with which a user may communicate and/or receive communications from. For example, a user's colleagues in a work environment may be considered contacts as well as members of a user's family may be considered contacts. Contacts may also be part of and classified into contact groupings, such as related contacts in a family grouping or colleagues in a work grouping.

Figure 1:
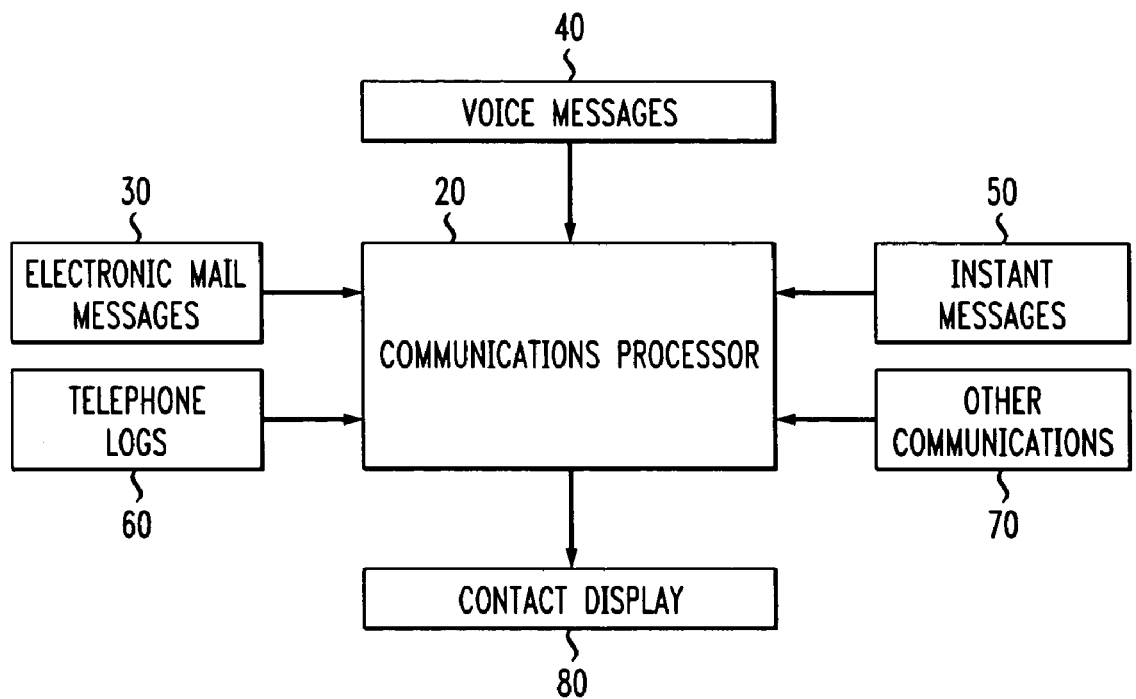
FIG. 1 illustrates an exemplary system in accordance with the teachings of the present invention.

Referring to FIG. 1, a system 10 of the present invention includes a communications processor 20 which analyzes a user's communications, such as the user's electronic mail messages 30, voicemail messages 40, instant messages 50, telephone logs 60 and/or other communications 70 to determine contact identities, priorities and relationships. In a preferred embodiment, the communications processor 20 may be configured as specialized software which implements the methods disclosed here and may be run on a computing device, such as a personal computer, personal digital assistant, wireless phone or other similar device. Such specialized software which implements the methods described herein may also be used in a network device, such as a network server or electronic message server, such as an electronic mail message server. In the present invention, the communications processor 20 will receive and analyze the communications, such as electronic mail messages 20, and provide a contact network display 80 to the user. In one embodiment, the contact display 80 may include a listing of the identified contacts from the communications. Such a listing may be prioritized and arranged in a manner according to the rankings of the contacts as determined from an analysis of the communications, as shown and described later herein.

Figure 2:
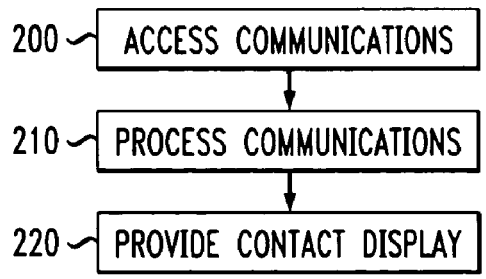
FIG. 2 illustrates an exemplary method in accordance with the teachings of the present invention.

Referring to FIG. 2, a first generalized embodiment of a process for analyzing a user's communications in accordance with the teachings of the present invention is shown. In this embodiment, a plurality of communications are accessed or extracted, step 200, such as by communications processor 20 previously shown in FIG. 1. Once accessed, the communications are processed to determine the relative importance of contacts based on the communications, step 210, such as by the communications processor 20. Once processed, a contact display 220 is provided to the user, step 220, which may include clusters of related contacts. The user is then free to approve and/or modify the contact display as the user sees fit.

Figure 3:
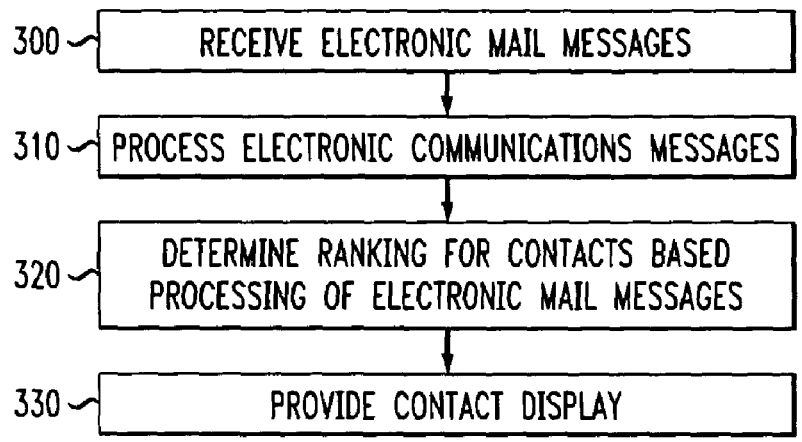
FIG. 3 illustrates another exemplary method in accordance with the teachings of the present invention.

Referring to FIG. 3, another embodiment for analyzing a user's communication is shown As shown in FIG. 3, a collection of communication messages, such as electronic mail messages, are received from a user, step 300. In one embodiment of the present invention, the user may specify certain folders, directories, networks or other locations in which these communication messages are stored. These communication messages are processed, step 310, which may include determining the amount of messages from certain specific contacts, an analysis of the message content and/or a determination if the user and the contact have participated in mutual reciprocal communications. Once the messages are processed, a contact ranking is determined based on the processing of the messages, step 320. A contact display of the user's identified contacts is then provided to the user, step 330. In alternative embodiments, other information may be provided to the user via the contact display, such as the priority ratings of each contact and any determined relationships between contacts and the user.

In one embodiment of the present invention, the communications analysis process may be accomplished by initially having a user provide or specify one or more electronic mail folders to process. Once the electronic mail folders are specified, electronic mail message header information from the electronic mail messages are analyzed to determine a relative importance of entities or contacts mentioned in the messages. For electronic mail messages, the header fields, such as the to:, from:, cc:, and bcc: fields may be analyzed to determine which contacts are mentioned or referenced in the messages. In one embodiment, greater priority/weight is attached to contacts who engage in frequent, reciprocal communication (i.e., the user responds to messages from the contact and vice versa), as opposed to if the user sends or receives communications without any reciprocity.

Figure 4:
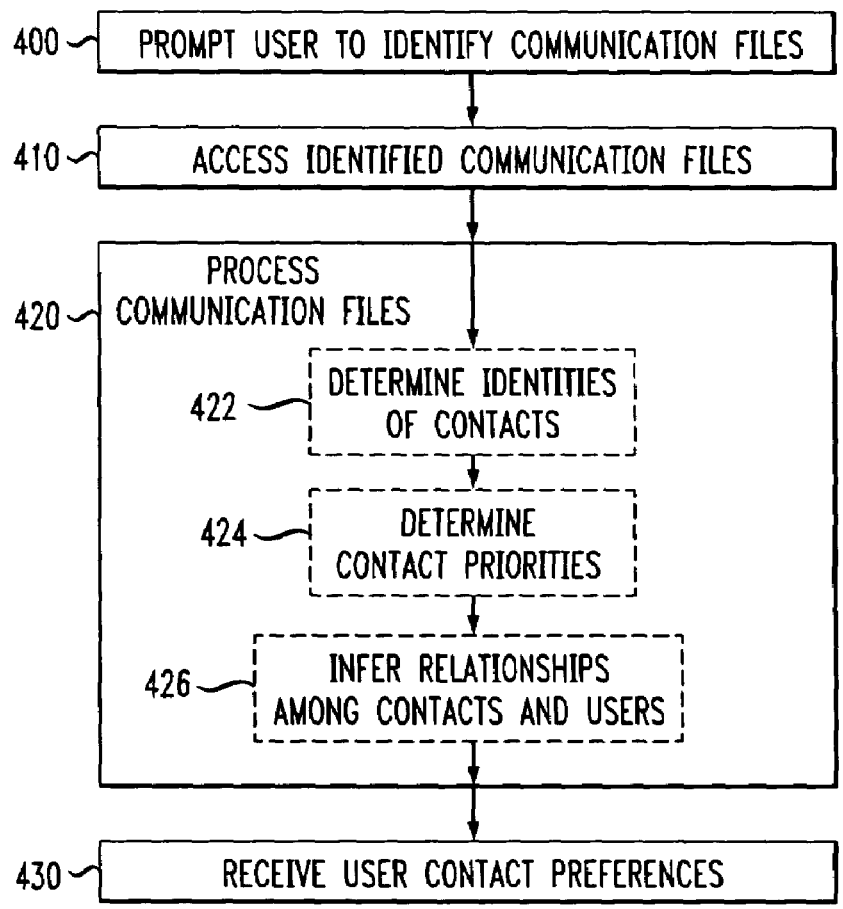
FIG. 4 illustrates yet another exemplary method in accordance with the teachings of the present invention.

Referring to FIG. 4, another embodiment of the present method for analyzing communications is shown. In this embodiment, a user may be prompted to identify a collection of existing communication files, such as a directory or folder of electronic mail messages, step 400. The identified communication files are accessed, step 410, for example, by accessing a network directory or folder containing the electronic mail messages. Once accessed, the communication files are processed, step 420. Processing the communication files, step 420, may include determining the identities of contacts within the communication files, substep 422; determining the priorities of contacts relative to one another and/or relative to the user, substep 424; and determining any relationships among the contacts and/or the user, substep 426. Once the communication files have been processed, the user's contact preferences are received, step 430. The user's contact preferences may be in form of approvals and disapprovals of the contact identities, priorities and arrangements determined in step 420. For example, if a contact X is determined to be a higher priority contact than a contact Y, the user may override such a determination and assign a higher priority to contact Y even though contact X was previously determined to be of higher priority.

In the present invention, it is contemplated that users can process their communication files, such as their electronic mail messages, via the communications analysis process described herein at any time to create a contact network or incrementally update their contact network display. For example, the message or communications processing may be used to identify new contacts within a user's electronic mail messages and possibly add these new contacts to the user's workspace. Such an updating is best performed at some incremental time interval to ensure that the user's contact network contains the most updated set of contacts.

Figure 5:
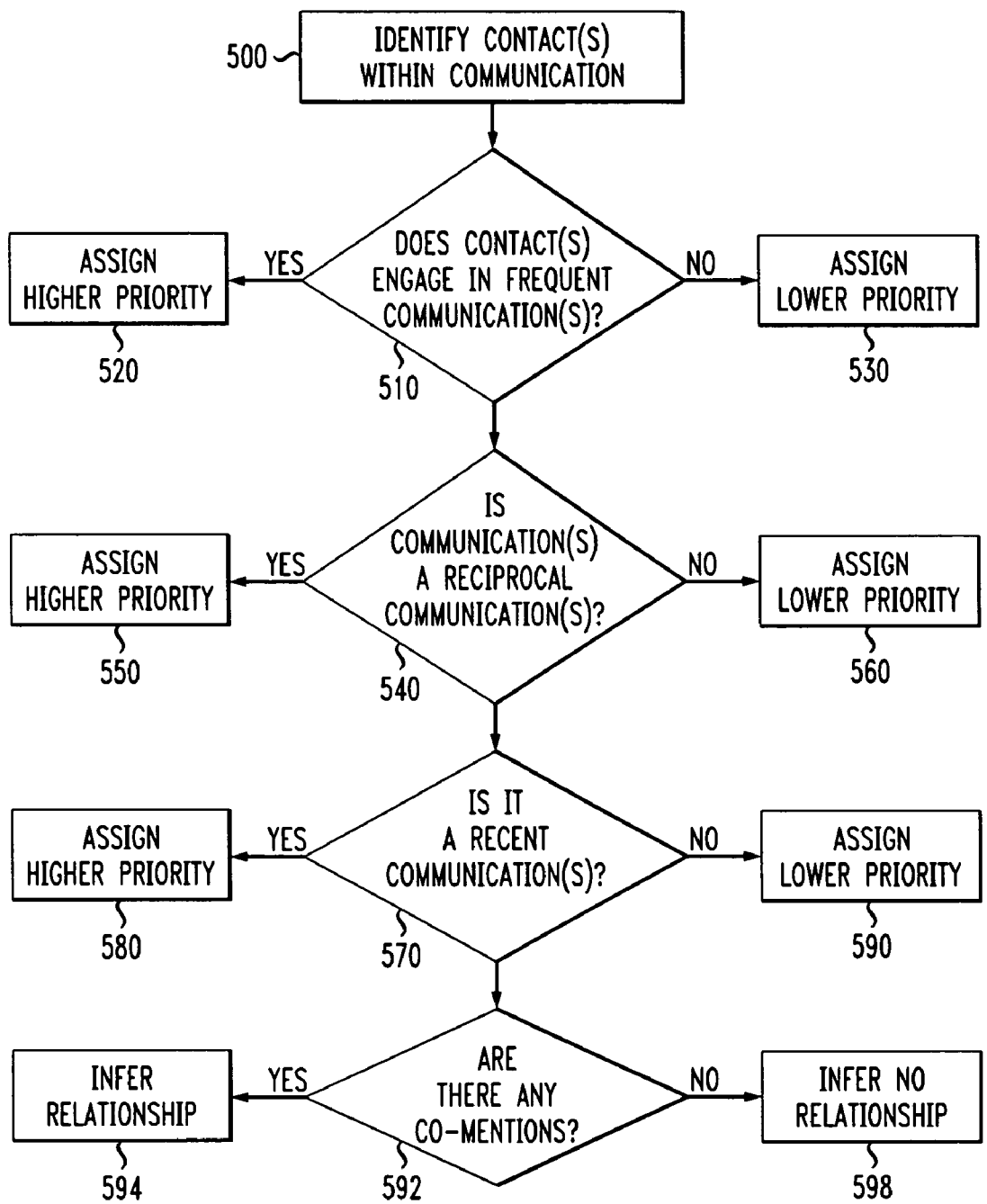
FIG. 5 illustrates still another exemplary method in accordance with the teachings of the present invention.

Referring to FIG. 5, another embodiment of the present method for analyzing a user's communications is shown. In this embodiment, one or more contacts are identified within a communication, step 500, such as be reviewing a header portion of an electronic mail message and/or voicemail message. A determination is made whether the identified contact or contacts have engaged in frequent communications with the user, step 510. Such a determination may be made, for example, by simply counting the number of messages a contact either sent to the user and/or received from the user. If the contact or contacts have engaged in frequent communications with the user, the contact or contacts are assigned a higher priority, step 520. If the contact or contacts have not engaged in frequent communications with the user, the contact or contacts are assigned a relative lower priority, step 530. The threshold for what constitutes frequent communications may be set at any level. For example, the threshold may be set at ten (10) communications, such that if it is determined that a contact engaged in at least ten (10) communications with the user, that contact will then be assigned a higher priority.

Referring again to FIG. 5, another determination is made to decide whether the communications between the user and the contact or contacts are reciprocal communications, e.g., if the communication from the contact is in response to an initial communication from the user, step 540. Reciprocal communications can also be initiated by a contact and thus responses by the user to an initial communication by the contact may also be considered to be reciprocal communications. If the contact or contacts have engaged in reciprocal communications with the user, the contact or contacts are assigned a higher priority, step 550. If the contact or contacts have not engaged in reciprocal communications with the user, the contact or contacts are assigned a relative lower priority, step 560. For example, if a user receives a message from a particular contact, and the user does not reply to the message, the contact may be given a lower priority rating. Additionally, if the user continually receives message from a particular contact and never replies to the message, the contact may be given an even lower priority rating.

Referring again to FIG. 5, a determination may be made based on the recency of the communication, step 570, e.g. how old the communication is relative to other communications being analyzed. Such a determination may be made, for example, by simply processing the date field in an electronic mail message header. If it is determined that the communication is a recent communication, the contact associated with the recent communication may be assigned a higher priority, step 580. If the communication is determined to be an old or a relatively older communication, the contact associated with the communication may be assigned a relative lower priority, step 590. The threshold for what constitutes a recent communication may be set at any level. For example, the threshold may be configured such that any communication that is less than a month old can be considered recent and any communication received that is older than a month may be considered not recent. Furthermore, additional temporal information such as the recency and duration of interactions or rapidity of responses in reciprocal interactions may be analyzed in determining the priority of contacts for a user. For example, contacts which engage in relatively longer duration communications and/or correspond with a user in rapid, reciprocal communications may be rated higher than contacts which do not. For example, if a contact often replies to a message from the user, or the user frequently replies to messages from that particular contact, then it may be inferred that the contact is important to the user. Another strong criterion for inferring importance is if the user often sends messages to the contact. Frequent attempts by the user to target the contact may be some indication of the contact's value. Weaker criteria are that the Contact often sends messages to the user, or is mentioned in (but does not originate) messages to and from the user.

Referring yet again to FIG. 5, another determination is made to decide whether there are any co-mentions in the communications, step 592. As used herein, the term "co-mentions" refers to certain contacts that are referenced or mentioned within the user's communications, such as in their electronic mail messages. For messages or communications involving more than a sender and a single recipient, the group or set of contacts that are mentioned together in the same message will be referenced as "co-mentions". Relations are thus inferred between contacts on the basis of these co-mentions. For example, the more that people are mentioned together, the stronger the inferred relationship, as discussed in more detail later herein.

In one embodiment, the system message processing or communications analysis determines whether or not contacts are mentioned in the header fields of the same electronic mail message. For example, if two people are repeatedly mentioned in the "to:" field of an electronic mail message header from a given contact, then an inference may be made that there is a relationship between that contact and the two co-mentioned people. This information about relationships has two potential benefits: (a) it allows the construction of groups, with straightforward addressing since instead of having to set up electronic mail aliases for groups a user repeatedly communicates with, these groups may be detected automatically and can be used for rapid addressing of messages to multiple individuals; (b) co-mentions may be useful in guiding contact layout, e.g. with co-mentioned contacts being near one another in the initial automatic layout configuration of the user's workspace display. In another embodiment of the present invention, co-mentions may be determined by determining whether a contact routinely forwards a message from another contact to the user or vice versa. In such a case, the contact from which the forwarded message originated, may be considered to be related to the contact which forwarded the message and/or also the user. Referring back to FIG. 5, if two or more contacts have been co-mentioned within the communications, a relationship between the contacts themselves and/or the user is inferred, step 594. If there are no co-mentioning of contacts within the communications, no relationship between the contacts themselves and/or the user is inferred, step 598.

In one embodiment of the present invention, importance ranking of contact(s) may be represented as a linear equation using the following weightings on the above criteria:

$$\text{Importance score}=Kx_1+Lx_2+Mx_3+Nx_4,$$

where $x_1$=number of messages the user replies to from the originating contact;

$x_2$=number of messages the user sends to the contact excluding replies;

$x_3$=number of reply messages from the contact;

$x_4$=combined total of messages that are not composed by the user in which the contact is mentioned in the cc or to lines, plus messages from the contact that are not replies;

K, L, M and N are constant weightings. K applies to messages involving reciprocity and is very large to respect the significance of reciprocal interactions initiated by the user. L is moderately large, based on the intuition that if the user initiates a communication with a contact this suggests that they attach importance to that person. M is also moderately large to respect the importance of contact initiated interactivity. N is small based on the proposition that little value is attached to messages initiated by other people that are not responses, e.g. some of which may be "spam". Similarly, passing mentions of a contact name in messages, to, and from, others may not be highly rated.

Referring now to FIG. 6, an exemplary contact network display or listing 600 is shown. After the communications analysis or processing as described above is performed, the user may be provided with such a display or listing 600. In one embodiment, the display 600 includes a name section 610, an address section 620, an oldest message date section 630 and a newest message date section 640 and a score section 650. An approval or "include" section 660 may also be provided to the user, which allows the user to include or exclude any number of contacts from the user's contact network.

In the present invention, any number of scoring schemes may be used to rate or prioritize contacts based on the communications processing discussed herein. For example, a 1 to 300 scale may be used, a 1 to 10 scale may also be used as well as an A-Z rating scheme. Rating points or allocations may be provided to a contact in also a number of different manners. For example, a contact may be assigned or awarded a single point for every piece of communication, i.e. electronic mail message, voicemail message, instant message, etc. that the contact participated in with the user. For example, if a certain contact sent ten electronic mail messages to the user, the contact will be awarded 10 point under this exemplary scoring scheme. The contact's cumulative score may be adjusted by a number of factors, such as by increasing the score if the contact and the user engaged in reciprocal rather than one-way communications. The term "one-way" communications being defined as if the contact sent the user certain communications, but the user never responded to the communications, such as may be the case in terms of "SPAM" or unsolicited electronic mail. Using another exemplary rating or scoring scheme, the contact score may be modified based on certain portions of the communication's content, for example, if the content of a message is determined to have many informal, slang, or otherwise colloquial uses of language in the message content, the contact may be considered to be a personal rather than a business or professional contact and then rated higher or lower accordingly depending on the preferences of the user.

In implementing the teachings of the present invention, it is preferable to develop the system and method herein with an object-oriented structure which may be written in an object-oriented language such as Java. One exemplary implementation may include a set of higher-level user interface components on top of an underlying persistent contact-based data layer and message analysis component. Data objects may be strictly separated from their display to allow multiple display components to display the same underlying data. The Java delegation event model may be used to allow user interface components to easily track changes to underlying data objects. Java object serialization may also be used to persistently store contact information. Referring to FIGS. 7a-7d, an exemplary code listing is shown which may be used to prioritize contacts as discussed herein is shown. Referring to FIGS. 8a-8b, an exemplary code listing is shown which may be used to cluster contact in accordance with the teachings herein.

It will be apparent to those skilled in the art that many changes and substitutions can be made to the system and method described herein without departing from the spirit and scope of the invention as defined by the appended claims. For example, natural language analysis techniques and programs that analyze, for example, electronic mail messages, may be used. Additionally, voice recognition analysis techniques and programs may also be used to analyze the communications, such as voicemail messages. For example, voice recognition analysis may be used to convert voicemail messages into text. The text may then be processed to extract certain contact information from the text, such as contact names, numbers, etc.

We claim:

1. A method for analyzing one or more user's communication messages that contain communications from a plurality of contacts, the method comprising:
    a) accessing a plurality of communication messages; and
    b) processing the plurality of communication messages, wherein the processing of the plurality of communication messages includes:
        1) identifying the plurality of contacts;
        2) assigning a relative priority ranking to each of the plurality of contacts based on the plurality of communication messages; and
        3) inferring relationships between or among the contacts, and relationships between the one or more users and the contacts based on the plurality of communication messages;
    wherein the relative priority rankings assigning step includes assigning the relative priority rankings based on an equation:

Importance=$Kx_1+Lx_2+Mx_3+Nx_4$, wherein:
    $x_1$=a number of messages the user replies to from the originating contact;
    $x_2$=a number of messages the user sends to the contact excluding replies;
    $x_3$=a number of reply messages from the contact;
    $x_4$=a combined total of messages that are not composed by the user in which the contact is mentioned in the cc or to lines, plus messages from the contact that are not replies; and
    K, L, M and N are constant weightings.

2. The method of claim 1, wherein the assigning step includes:
    assigning higher relative priority rankings to contacts that engage in frequent communications with the user; and
    assigning lower relative priority rankings to contacts that engage in less frequent communications with the user.

3. The method of claim 1, wherein the assigning step includes:
    assigning higher relative priority rankings to contacts that engage in more recent communications with the user; and
    assigning lower relative priority rankings to contacts that engage in less recent communications with the user.

4. The method of claim 1, wherein the communication messages are electronic mail messages.

5. The method of claim 1, wherein processing the plurality of communication messages includes:
    assigning higher relative priority rankings to contacts that engage in reciprocal communications with the user.

6. The method of claim 1, wherein processing the plurality of communication messages includes:
    determining if a contact has engaged in reciprocal communications with the user.

7. The method of claim 6, further comprising:
    assigning higher relative priority rankings to contacts that engage in frequent reciprocal communications with the user.

8. The method of claim 1, wherein the relationships inferring step includes:
    inferring relationships between two or more contacts based on a mentioning of the contacts within the communications.

9. The method of claim 1, wherein the relationships inferring step includes:
    inferring the relationships between contacts based on a mentioning of the contacts within one or more communication message headers.

10. The method of claim 1, wherein processing the plurality of communication messages includes:
    employing voice recognition techniques to convert voicemail messages to text in order to extract contact information from the communication messages.

11. The method of claim 1, wherein the communication messages are voicemail messages.

12. The method of claim 1, wherein the communication messages are instant messages.

13. The method of claim 1, wherein the communication messages are telephone logs.

14. The method of claim 1, wherein the communication messages are facsimiles.

15. The method of claim 1, further comprising:
    creating a contact network that models the contacts and the inferred relationships, so as to enable a contact network display for output.

16. A method for processing user communication files to determine identities of contacts within the communication files, to prioritize relative importance of the contacts identified and to infer relationships between the contacts, the method comprising:

receiving a plurality of communication files, wherein the communication files involve a plurality of different contacts;

reviewing the plurality of communication files to identify contacts, to assign relative priority rankings to the contacts, and to infer relationships between or among the contacts and relationships between the one or more users and the contacts; and outputting the identities of the contacts identified in the communication files, the relative contact priority rankings and any inferred relationships;

wherein the relative priority rankings assigning step includes assigning the relative priority rankings based on an equation:

$$\text{Importance} = Kx_1 + Lx_2 + Mx_3 + Nx_4,$$

wherein:

$x_1$=a number of messages the user replies to from the originating contact;

$x_2$=a number of messages the user sends to the contact excluding replies;

$x_3$=a number of reply messages from the contact;

$x_4$=a combined total of messages that are not composed by the user in which the contact is mentioned in the cc or to lines, plus messages from the contact that are not replies; and K, L, M and N are constant weightings.

17. The method of claim 16, wherein reviewing the plurality of communication files includes:

determining whether the communication files are unsolicited communications or responsive to communications initiated by the user.

18. The method of claim 16, wherein reviewing the plurality of communication files includes:

determining which contacts are co-mentioned within the communication files.

19. The method of claim 18, wherein the reviewing step includes:

if two or more contacts are co-mentioned with two or more communication files, inferring that the two or more contacts to be related.

20. The method of claim 16, wherein reviewing the plurality of communication files includes:

parsing the plurality of communication files to determine whether prior reciprocal communications exist between a particular contact and the user.

21. The method of claim 16, wherein the communication files are electronic mail messages.

22. The method of claim 21, further comprising:

receiving from the user, a specification of the electronic mail messages.

23. The method of claim 16, further comprising:

creating a contact network that models the contacts and the inferred relationships, so as to enable a contact network display for output.

24. A method for identifying a user's potential contacts, relatively prioritizing these potential contacts, and inferring any relationships between these potential contacts based on a plurality of stored messages, the method comprising:

a) analyzing the plurality of stored messages, the analyzing including:
1) identifying the potential contacts within the stored messages;
2) assigning relative priority rankings to the respective identified potential contacts based on the plurality of stored messages; and
3) inferring relationships between the potential contacts mentioned in the stored messages based on the stored messages; and b) receiving from the user, approvals of the potential contacts that have been identified and priority ranked;

wherein the relative priority rankings assigning step includes assigning the relative priority rankings based on an equation:

$$\text{Importance} = Kx_1 + Lx_2 + Mx_3 + Nx_4,$$

wherein:

$x_1$=a number of messages the user replies to from the originating contact;

$x_2$=a number of messages the user sends to the contact excluding replies;

$x_3$=a number of reply messages from the contact;

$x_4$=a combined total of messages that are not composed by the user in which the contact is mentioned in the cc or to lines, plus messages from the contact that are not replies; and K, L, M and N are constant weightings.

25. The method of claim 24, wherein the relative priority rankings assigning step includes determining the relative importance of contacts based on one or more of:

a frequency of communications between the contacts and the user, a recency of the communications between the contacts and the user, and a reciprocity of the communications between the contacts and the user.

26. The method of claim 24, further comprising:

creating a contact network that models the contacts and the inferred relationships, so as to enable a contact network display for output.

* * * * *